United States Patent [19]
Borchard et al.

[11] 3,819,315
[45] June 25, 1974

[54] APPARATUS FOR STAMPING INFORMATION CARRIERS FROM A PLASTIC FOIL

[75] Inventors: Heinz Borchard, Nortorf; Robert Kasch, Alt Muhlendorf Bei Nortorf; Bruno Rybka, Nortorf, all of Germany

[73] Assignee: Ted-Bildplatten Aktiengesellschaft Aeg-Telefunken-Teldec, Zug, Switzerland

[22] Filed: Jan. 9, 1973

[21] Appl. No.: 322,153

[52] U.S. Cl. ............... 425/383, 425/384, 425/385, 425/394, 425/DIG. 810
[51] Int. Cl. .................. B29d 17/00, B29c 17/00
[58] Field of Search .......... 425/383, 384, 394, 406, 425/407, 411, 810, 385, DIG. 29, DIG. 30, 109

[56] References Cited
UNITED STATES PATENTS

| | | | |
|---|---|---|---|
| 1,576,642 | 3/1926 | Bishop | 425/810 |
| 2,346,760 | 4/1944 | Klebes | 425/810 |
| 2,998,622 | 9/1961 | Renoux | 425/810 |
| 3,018,513 | 1/1962 | Adams et al. | 425/385 |
| 3,311,692 | 3/1967 | Baird | 425/384 X |
| 3,474,494 | 10/1969 | Damm et al. | 425/384 X |

FOREIGN PATENTS OR APPLICATIONS

| | | | |
|---|---|---|---|
| 1,285,995 | 1/1962 | France | 425/109 |

Primary Examiner—J. Howard Flint, Jr.
Attorney, Agent, or Firm—Spencer & Kaye

[57] ABSTRACT

In apparatus for stamping foils with a relief pattern, employing a resilient buffer pad to press the foil to be stamped against the matrix carrying the negative of the relief pattern, the buffer pad includes a plastic surface layer slidably disposed on a rubber elastic pad. This plastic layer provides the outer surface of the buffer pad which presses against the foil. In order to enable the plastic layer to be able to more easily slide over the rubber elastic pad, a slide layer is placed between the two layers. This slide layer can consist of a silicone paste. The buffer pad is outwardly bulged toward the foil when initially coming into contact with the foil and then as the buffer pad presses the foil against the matrix the buffer pad is flattened. To increase the ability of the buffer pad to be bulged in this manner, the buffer pad is placed upon a plastic pad which preferably consists of two plastic layers.

12 Claims, 6 Drawing Figures

3,819,315

APPARATUS FOR STAMPING INFORMATION CARRIERS FROM A PLASTIC FOIL

BACKGROUND OF THE INVENTION

The present invention pertains to apparatus for stamping a relief pattern, for example of spiral-shaped grooves, into the surface of a plastic foil. In such a stamping operation the plastic foil is heated as it is pressed against a matrix by a resilient buffer pad. The surface of the matrix against which the plastic foil is pressed contains the negative of the relief pattern.

The stamping apparatuses which are commonly utilized for the production of foil-shaped information carriers, e.g., plastic foils containing mechanically scannable sound recordings, include two-part stamping tools which are operated with die stamps or screw presses. The matrix, which is capable of being both heated and cooled, forms the first part of the stamping tool. The surface of the matrix carries the negative groove image. The second part of the stamping tool is a resilient buffer pad.

Various proposals have been made for designing the buffer pad to be convexly curved and elastically deformed during the phase of compressing the two parts of the stamping tool together for forcing out the air between the matrix and the foil to be stamped. Such a procedure becomes necessary to ensure that the foil contacts the matrix over its entire surface in order that a perfect reproduction is produced in the stamping operation. These deformable buffer pads may be constructed of spring elastic sheet metal, rubber elastic materials, or of pneumatically or hydraulically bulgeable membranes.

The technique described above, however is not sufficiently accurate for producing information carriers in which a substantially higher order of precision is required, as for example for plastic foils containing recorded video signals. Since these foils run at unusually high playing speeds of for example 1500 rpm, they must be free from wobble and eccentricity in order that the pickup of the playback instrument will always maintain good contact with the spiral grooves with very little variance. Particularly high demands are thus placed upon the stamping tool for such foils and these demands have not been met with the known structures.

SUMMARY OF THE INVENTION

An object of the present invention is to eliminate the drawbacks in the stamping of foils with conventional systems as discussed above.

Another object of the present invention is to enable the foils to be stamped without creating irregularly distributed stresses along the surfaces which may lead to warping of the finished stamped foil and thus to interference with the uniform movement of a transducer along the spiral grooves.

Since the microgrooves which are stamped into such foil have a depth of about only 1 percent of the thickness of the foil, which thickness can generally vary by about 10 percent, it becomes necessary to use a resilient buffer pad in the stamping process. Consequently, a further object of the present invention is to construct a buffer pad which elastically compensates for these variations in the thickness of the foil during the stamping operation without creating differences in pressure and local displacements in the plane of the foil which would lead to the stresses mentioned above.

The electrolytically developed matrices which are employed also have variations in their thicknesses which require adaptation of the buffer pad in order to compensate for these variations. This adaptation of the buffer pad, however, can be accomplished, in contrast to the above-mentioned elastic compensation, by a one-time, permanent deformation of the pad surface. This deformation of the pad surface need only be redone upon changing the matrix.

These objects are accomplished in accordance with the present invention by utilizing in the apparatus for stamping a relief pattern into the surface of a plastic foil a resilient buffer pad which has a surface layer of plastic which is slidably disposed over a rubber elastic pad. The plastic foil is pressed between the matrix, which has on its surface the negative of the desired relief pattern, and this plastic surface layer of the resilient buffer pad. This plastic surface layer preferably consists of a thermoplastically deformable material and one desirable form for the layer is a plastic foil. The plastic material for this surface layer is also preferably selected so that its softening temperature range lies somewhat above the stamping temperature to be employed during the operation.

In another embodiment of the present invention the plastic surface layer is disposed on a slide layer which is applied to the surface of the rubber elastic pad. A silicone paste, a synthetic solid lubricant based on polytetrafluoroethylene, for example, or a metallic soap may be utilized for this slide layer.

In accordance with a further embodiment of the present invention, the rubber elastic pad can be placed on a plastic pad. It has been found to be advantageous to construct this plastic pad of several layers. In utilizing this plastic pad with the present invention, the pad is constructed so as to be bulgeable and the layers of plastic padding are designed so as to exhibit only a slight amount of static friction with respect to each other.

BRIEF DESCRIPTION OF THE DRAWINGS

FIG. 2 is to the same scale as FIG. 1A.

DESCRIPTION OF THE PREFERRED EMBODIMENTS

Figure 1A:
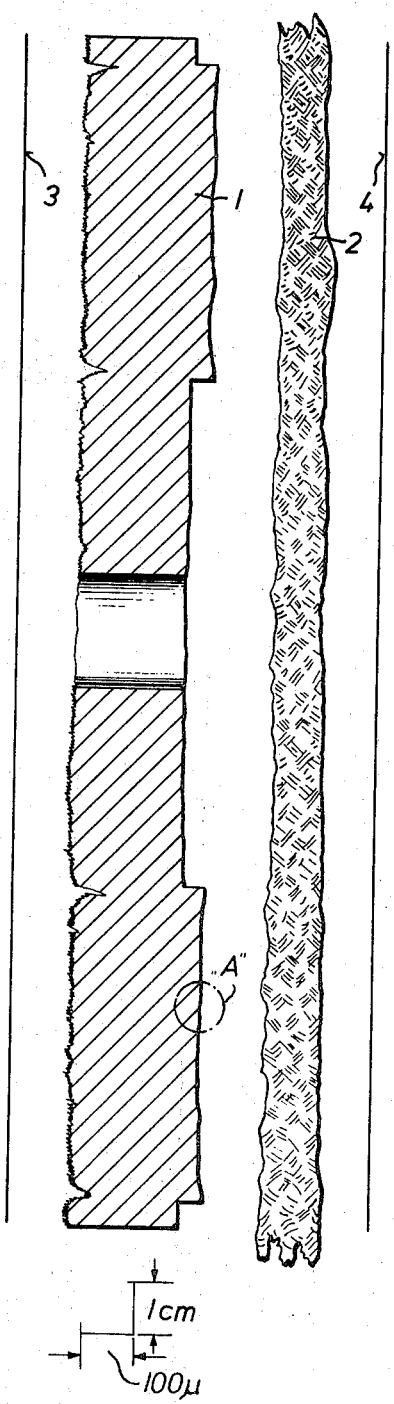
FIG. 1A is a cross-sectional side view of a stamping matrix and a foil to be stamped.
Figure 1B:
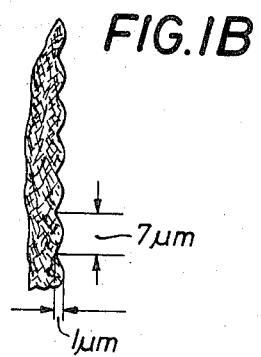
FIG. 1B shows an enlargement of section A of FIG. 1A. All dimensions in FIG. 1B are to the same scale as the horizontal thickness dimension of FIG. 1A.

FIG. 1A shows a section through a stamping matrix 1 and the foil 2 to be stamped with the thickness dimensions being shown to a scale 100 times that of the radial dimensions of the objects. With this type of illustration of the surfaces, which can be obtained, for example, by a rough measurement of the depth, it can clearly be seen that stamping of a fine surface relief (such as section A shown in detail in FIG. 1B) between two planar stamping dies whose surfaces are indicated by the two lines 3 and 4 would never be possible if the stamping dies are not resilient. FIG. 1B shows section A of the surface of the matrix 1 carrying the relief to be stamped. The depth of the spiral groove shown in FIG. 1B is $1\mu$ and the width of the groove, or pitch of the spiral, is $7\mu$.

In accordance with the present invention, an elastic buffer pad is utilized in order to ensure that a substantially uniform distribution of pressure is applied along the entire stamping surface without the occurrence of lateral shifts in the pad surface or of irregular macro flow phenomena in the material to be stamped.

In addition, variations in the surface of the matrix which are due to variations in its thickness, and which may be different for each new matrix, are substantially reproduced in the form of permanent deformations in the buffer pad.

Figure 2:
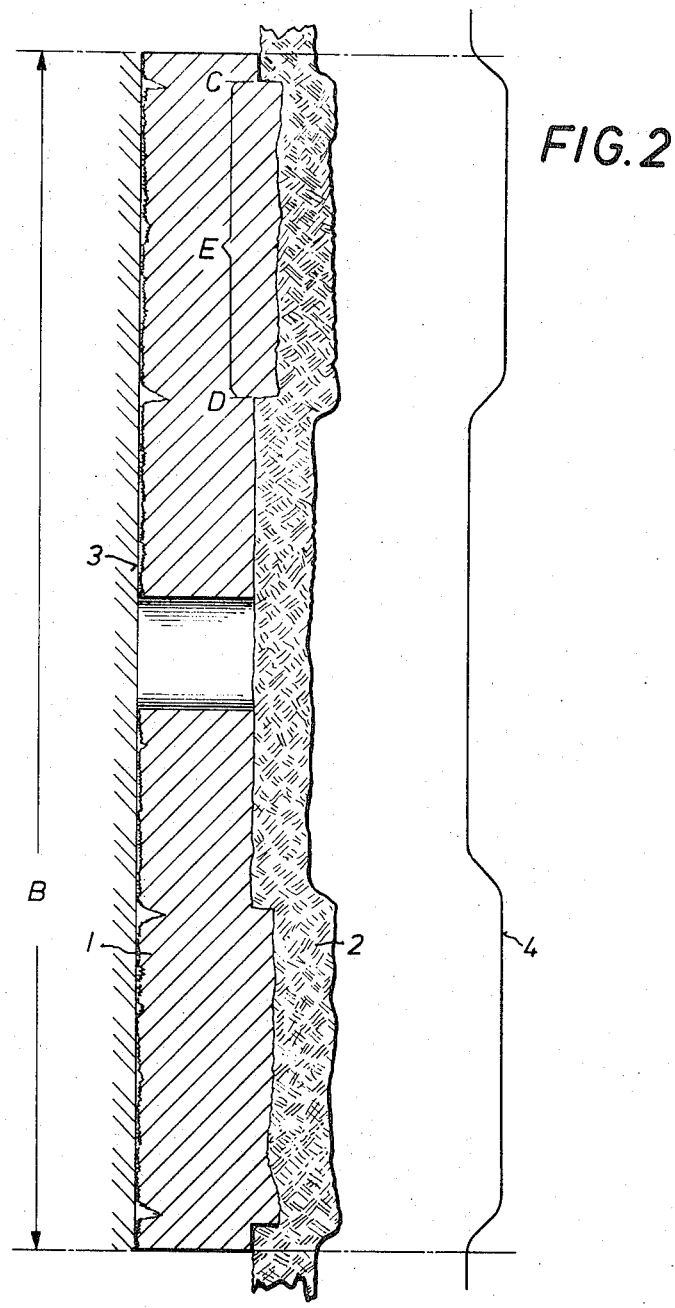
FIG. 2 is a cross-sectional side view similar to that of FIG. 1A of the stamping matrix, the foil and the surface of the buffer pad after the stamping process.

FIG. 2 provides an illustration which permits this effect to be explained in greater detail. FIG. 2 is drawn to the same scale as FIG. 1, i.e., the horizontal depth scale is 100 times as large as the vertical scale. This figure provides an example of how the rear of the stamped foil 2 should look after the stamping process if the front of the foil is to be provided with an accurate reproduction of the matrix relief pattern over its entire diameter, i.e., dimension B. The matrix 1 is shown with its rear side resting on the heatable and coolable metallic stamping die 3. A buffer pad, with outer surface 4, is positioned so as to be able to press the foil 2 against the matrix 1. This illustration provides an indication of the elastic and permanent deformations which the surface of the pad is subjected to during the stamping operation.

Initially, when a new matrix is installed, the coarse relief of the matrix, particularly at radius sections C and D, must be stamped into the surface layer of the buffer pad. Also the coarse deviations from a flat plane at the surface E, which bears the groove relief pattern, must be molded into the surface of the pad as permanently as possible insofar as these deviations substantially exceed the possible differences in thickness of the foil material which is to be stamped, since this relief remains in the same shape during the then following mass stampings. Coarse deviations are those which are substantially more gradual than surface deviations representing the groove pattern. Only when the matrix is replaced will a different relief, corresponding to the new matrix, again have to be molded into the surface of the pad.

The end of the relief pattern (point D) of the various matrices may under certain circumstances lie at an altogether different diameter since the position of this end point D depends on the duration of the recorded information.

According to the present invention, as already mentioned, a part of this "general unevenness" in the matrix is compensated for by the permanent deformation of the surface of the buffer pad during the stamping operation. FIG. 2 shows the necessary shape of the surface 4 of the buffer pad after the stamping operation.

The present invention further provides for the compensation, during the actual stamping of the individual foils 2 (FIG. 2), of the differences in the thicknesses of the foil materials, which can vary from stamping to stamping, so that approximately the same pressure is exerted on every point of the entire stamping surface in the diameter range B. Any differences in pressure applied against the back of the foil to be stamped would lead to localized stresses tending to deform the material. The result of such stresses would be differently orientated deformations in each localized area in the finished foil which would lead to undesirable warping of the foil. These types of deformations would particularly form in the layer near the surface and would thus constitute the greatest danger of warping the foil and distorting the information. Warping stresses could also result if laterally directed forces from the surface of the pad were transmitted to the foil. The present invention makes it possible to avoid, during the entire sequence of the stamping operation, the occurrence of local changes in the pad surface in the plane of the stamping surface.

A buffer pad constructed in accordance with the present invention will be described in detail with the reference to FIGS. 3 to 5.

Figure 3:
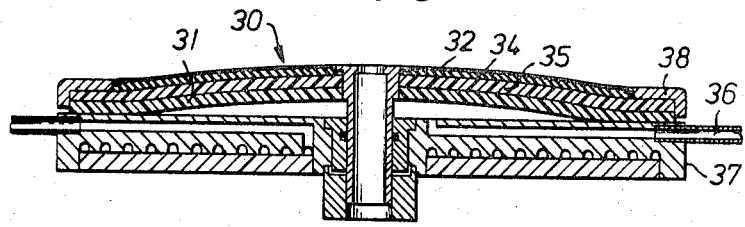
FIGS. 3 and 4 are cross-sectional side views of the buffer pad in the bulged and flattened state, respectively.
Figure 4:
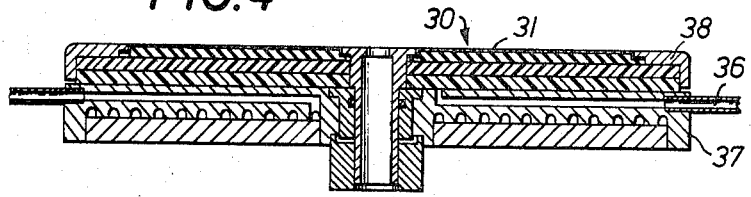

FIG. 3 is a cross-sectional view through a buffer pad 30 in the bulged position and FIG. 4 of the buffer pad 30 in the flattened position. The bulging is produced by the introduction of compressed air into the structure through the tube 36. The entire multi-layer pad is mounted on a supporting body 37 by means of a fastening ring 38. The buffer pad 30 is composed of several individual layers of material 31–35, which will be described in detail with reference to FIG. 5. The compressed air entering through tube 36 forces the buffer pad 30 to bulge out from the support 37 with the ends of the pad being held down by the ring 38.

Figure 5:
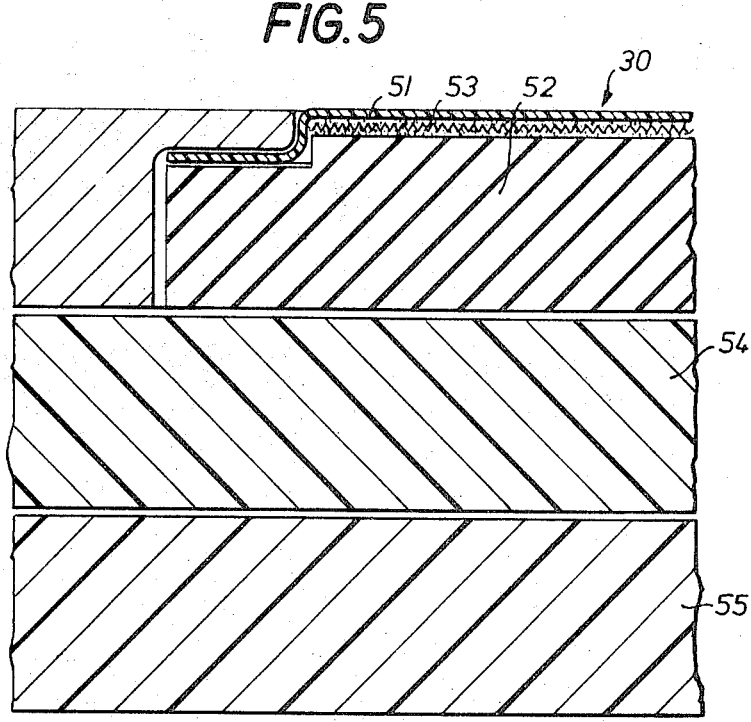
FIG. 5 is a cross-sectional side detail view of the structure of the buffer pad.

FIG. 5 shows an example of the layer structure of the buffer pad 30. The materials of the individual layers are preferably selected in order that the pad is usable for the stamping of hard PVC (polyvinyl chloride) foils which are stamped at temperatures of 130° to 170°C. The layers 51–55 as shown in FIG. 5 respectively correspond to the layers 31–35 of FIG. 3.

The plastic surface layer 51 preferably consists of polyterephthalate and has a thickness of 0.35 mm. The following properties of the polyterephthalate material assure, in cooperation with the structure of the buffer pad, the fulfillment of the desired objectives: tensile strength of 1,800 kp/cm²; degree of expansion before breaking of 50 percent; and permanent heat resistance of 130°C. This surface layer 51 also must be able to slide, with little friction, on the rubber elastic buffer pad layer 52 which is disposed beneath the layer 51. A slide layer 53 is disposed between layer 51 and layer 52 in order to enable layer 51 to be able to more easily slide along the surface of layer 52.

For this purpose, slide layer 53 is preferably made of a silicone paste. The silicone paste is initially applied to the surface of the rubber layer 52 in a thin layer. After surface layer 51 has been placed into position, the paste is then uniformly distributed over the pad and worked into the rougher surface of the rubber buffer pad layer 52 in a plurality of compressions under high pressure and without bulging of the pad. The rubber pad layer 52 should have a Shore hardness of about 60. The thickness of the rubber buffer pad layer 52 is 6 mm.

This resilient buffer pad consisting of layers 51 to 53 is mounted on a plastic pad which in the embodiment of FIG. 5 is made of two layers 54 and 55. The upper layer 54 consists of polyamide and is 4 mm thick. The layer 55 consists of a copolymerizate based on a polymethylene oxide and is 5 mm thick. Layer 54 together with layer 55 forms a membrane which can be pneumatically bulged from the rear. This combination bulges especially well since the layer 54 has particularly good sliding properties.

Furthermore, the two plastics of the membrane can be selected so that the upper layer has the better shape retention when heated and greater expandability but lesser tensile strength and hardness. This selection assures a good bulgeability of the pad at lesser air pressure than with a single-layer membrane structure.

The surface layer 51 becomes increasingly viscous during the pressing of a new matrix having a pressing time which is longer than the normal cycle and which perhaps exhibits a somewhat higher temperature, particularly at its surface where the temperature is directly effective through the matrix. Consequently, there occurs a viscoelastic deformation of the surface of the plastic surface layer 51, i.e., an adaptation to the rough relief of the matrix.

After opening of the stamping die, a permanently deformed surface is obtained which approximately conforms to the rough matrix relief. Since a part of the viscoelastic deformation relaxes during the relaxation of pressure, the impressed depths do not quite correspond to the depth dimensions of the matrix. This permanently changed surface shape, however, does form an ideal die for use with the rough relief of the matrix.

The conditions which change from pressing to pressing due to the fluctuations in thickness of the foils to be pressed are elastically compensated for in contrast to the previously described viscously preshaped rough relief. Provisions are made, for this purpose, in the structure in accordance with the present invention. The first is to dispose a rubber elastic layer behind the above-mentioned plastic surface layer 31 or 51. This rubber elastic layer on the one hand, compensates for the local differences in pressure which may result from the differences in the thickness of the foil due to lateral local elastic shifts of individual volume elements without substantial forces being required for this compensation and, on the other hand, withstands, after the completed compensation in the final phase of the pressing process, the high specific stamping pressure of, for example, 200 kg/cm$^2$ without being mechanically destroyed. In addition, the plastic surface layer should be relatively thin but it should have a good stability. Since the lateral shifts may occur in the rubber elastic layer directly at the surface, they would be transferred to the plastic surface layer thereabove if the static friction between the bordering layers was too great.

In order to prevent this the second provision is of a slide layer between the plastic surface layer and rubber elastic pad layer. The static friction between the bordering layers is thus kept low enough that only slight forces are transmitted to the plastic surface layer upon the occurrence of local shifts. These slight forces then no longer cause any lateral shifts in this surface layer.

The material utilized for the record carrier foil may be polyvinyl chloride or other thermoplastic polymers. Information carriers were made by stamping, e.g., a P.V.C.-foil of 150 μm by exposing it to a temperature of about 150° (using a pressure of 190 Kp/cm$^2$ for 10 seconds, whereafter it is cooled in the press.

It will be understood that the above description of the present invention is susceptible to various modifications, changes and adaptations, and the same are intended to be comprehended within the meaning and range of equivalents of the appended claims.

We claim:

1. In apparatus for the stamping of a relief pattern into a surface of a plastic foil the apparatus including a matrix providing a negative of the pattern and a rubber elastic buffer pad which presses the foil against the matrix, the improvement comprising a layer of plastic slidably disposed on the surface of said buffer pad and arranged to press against the foil during a pressing operation.

2. Apparatus as defined in claim 1 wherein said plastic layer consists of a thermoplastically deformable material.

3. Apparatus as defined in claim 1 wherein said plastic layer consists of a plastic foil.

4. Apparatus as defined in claim 2 wherein said plastic layer has a softening range which lies above the heating temperature applied during the pressing operation.

5. Apparatus as defined in claim 1 further comprising a slide layer disposed between said plastic layer and said buffer pad.

6. Apparatus as defined in claim 5 wherein said slide layer is composed of a silicone paste.

7. Apparatus as defined in claim 5 wherein said slide layer includes a solid synthetic lubricant based on polytetrafluoroethylene.

8. Apparatus as defined in claim 5 wherein said slide layer includes a solid lubricant based on a metallic soap.

9. Apparatus as defined in claim 1 further comprising a plastic pad on which said buffer is mounted.

10. Apparatus as defined in claim 9 wherein said plastic pad is constructed of several plastic pad layers.

11. Apparatus as defined in claim 10 wherein said plastic pad is capable of being bulged and said plastic pad layers exhibit a low static friction with respect to one another.

12. Apparatus as defined in claim 1 wherein the relief pattern to be formed is in the form of spiral-shaped grooves.

* * * * *